United States Patent
Ramraz et al.

(10) Patent No.: US 10,915,430 B2
(45) Date of Patent: Feb. 9, 2021

(54) SOURCE CODE TEST CONSOLIDATION

(71) Applicant: Red Hat Israel, Ltd., Raanana (IL)

(72) Inventors: Oded Ramraz, Wellesley, MA (US);
Boaz Shuster, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 0 days.

(21) Appl. No.: 15/652,056

(22) Filed: Jul. 17, 2017

(65) Prior Publication Data
US 2019/0018761 A1 Jan. 17, 2019

(51) Int. Cl.
*G06F 11/36* (2006.01)

(52) U.S. Cl.
CPC ...... *G06F 11/3676* (2013.01); *G06F 11/3684* (2013.01); *G06F 11/3688* (2013.01)

(58) Field of Classification Search
CPC .. G06F 7/78; G06F 8/00–78; G06F 9/44–455; G06F 11/36; G06F 11/3676; G06F 11/3684; G06F 11/3688
See application file for complete search history.

(56) References Cited

U.S. PATENT DOCUMENTS

| | | | |
|---|---|---|---|
| 7,836,416 B2 | 11/2010 | Schubert et al. | |
| 8,074,204 B2 | 12/2011 | Comstock et al. | |
| 8,560,985 B1 | 10/2013 | Sahu et al. | |
| 8,904,319 B2 | 12/2014 | Bist et al. | |
| 9,529,697 B1 | 12/2016 | Aldrich et al. | |
| 2008/0307391 A1 | 12/2008 | Goel | |
| 2009/0064059 A1* | 3/2009 | Tsuchiya | G06F 17/504 716/100 |
| 2009/0265694 A1 | 10/2009 | Bakowski | |
| 2010/0287534 A1* | 11/2010 | Vangala | G06F 11/3612 717/124 |
| 2011/0197049 A1* | 8/2011 | Adir | G06F 9/3005 712/234 |
| 2013/0111267 A1* | 5/2013 | Beryoza | G06F 11/3688 714/32 |
| 2014/0089895 A1* | 3/2014 | Clee | G06F 8/71 717/121 |
| 2014/0115565 A1* | 4/2014 | Abraham | G06F 8/30 717/128 |
| 2018/0089058 A1* | 3/2018 | Anantharam | G06F 11/3692 |

OTHER PUBLICATIONS

Chen et al., State of the art: Dynamic symbolic execution for automated test generation (Year: 2012).*

(Continued)

*Primary Examiner* — Doon Y Chow
*Assistant Examiner* — Timothy P Duncan
(74) *Attorney, Agent, or Firm* — Lowenstein Sandler LLP

(57) ABSTRACT

A method includes identifying a set of tests for a source code, analyzing the set of tests to identify overlapping blocks of the source code that are to be tested by each of the set of tests, merging a subset of the tests that include the overlapping blocks of the source code to create a merged test, and causing the merged test to be executed to test the source code. In an implementation, code coverage results are used when analyzing the set of tests to identify overlapping blocks of the source code.

16 Claims, 7 Drawing Sheets

(56) References Cited

OTHER PUBLICATIONS

Unknown. Validating Tests with the Coverage Analyzer in Development Systems. SAP. https://help.sap.com/saphelp_nw70ehp2/helpdata/en/5c/8c1f1092834315a733662c54e3b5eb/content.htm. Retrieved on Jul. 17, 2017. 3 pages.
Sanjay Zalavadia.Using Best Practices Within the Scope of Automation. Dec. 8, 2016. Zephyr. https://www.getzephyr.com/insights/using-best-practices-within-scope-automation. Retrieved on Jul. 17, 2017. 1 page.
Unknown. Combining Code Coverage and FSM Graph in Riviera-PRO to extract FSM debug information. Aldec. https://www.aldec.com/en/support/resources/documentation/articles/1808. Retrieved on Jul. 17, 2017. 5 pages.
Unknown. Convert PHP Code to Flowchart. Athtek. http://www.athtek.com/code-to-flowchart/php.html#.WHe-WrN5B90. Retrieved on Jul. 14, 2017. 2 pages.
Unknown. Testing with PHPUnit and Selenium. Netbeans. https://netbeans.org/kb/docs/php/phpunit.html. Retrieved on Jul. 14, 2017. 13 pages.
Unknown. Auto Code Generator—AthTek Flowchart to Code. Athtek. http://www.athtek.com/flowchart-to-code.html#.WWkPwGeV-UI. Retrieved on Jul. 14, 2017. 3 pages.

\* cited by examiner

SOURCE CODE TEST CONSOLIDATION

TECHNICAL FIELD

The present disclosure is generally related to application source code testing, and is more specifically related to source code test consolidation using code coverage.

BACKGROUND

Prior to releasing source code in an application, the source code may be rigorously tested by numerous test suites. For example, various tools may be used to generate automated tests for the source code. In other instances, tests may be generated manually. In any case, the source code may undergo quality assurance to identify errors, flaws, failures, or faults in the source code by running the test suites. Code coverage may refer to a measure that describes the degree to which source code of an application is tested by a particular test suite. A test suite may include one or more tests that test one or more blocks of code in the source code. One test may use certain parameters to test a first code path and another test may use different parameters to test a second code path. An application with high code coverage has been more thoroughly tested and has a lower chance of containing an error, flaw, failure, or fault than an application with low code coverage.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Executing numerous test suites to test source code may consume a large amount of time and/or computing resources (e.g., processing, memory). It may be desirable to reduce the amount of time and/or resources consumed by the test suites executed on the source code. For example, in some situations, when there is an error, flaw, failure, or fault in production source code that causes the program implemented by the production source code to operate in unintended ways, it may desirable to deploy source code that fixes the error, flaw, failure, or fault as quickly as possible. As such, there may be a limited amount of time to test the source code including a patch that fixes the bug. Running a vast number of test suites to test the source code including the patch may not be feasible. Especially since the test suites often include tests that have a lot of overlap between them.

Accordingly, aspects of the present disclosure relate to combining code coverage methods and graph techniques to automatically (without user interaction) merge tests together to consume fewer resources (e.g., computing, memory) and reduce execution time of testing while still covering the same code lines. In an example, a testing component may analyze the various test suites to find overlapping blocks of code and/or test cases that are to be tested by each of the tests in the test suites and merging the tests that include the overlaps to create a merged test. The testing component may perform the analysis and the merging without requiring any user input. The merged test may cover the same code lines and/or test cases as the individual tests that were merged into the merged test and the merged test may execute in less time than running the individual tests separately.

In an implementation, a code coverage report may be generated for each test in the test suites to be run on the source code. The code coverage report may identify the blocks of code in the source code and/or test cases that are tested by a particular test. A code flow diagram may be generated for each of the code coverage reports. The code flow diagram may include nodes representing the blocks of code and/or test cases, and each node may indicate whether it is tested by the particular test. The code flow diagrams may be compared to determine whether nodes are indicated as being tested in different tests. If so, those code flow diagrams may be merged in view of a threshold (e.g., execution time, percentage of overlapping nodes) to create a merged test. The tests that were merged may be discarded and the merged test may be executed to test the source code. The merged test may test the same blocks of code as the individual tests that were merged and may execute in less time than separately running the individual tests that were merged. Further, executing the merged test may consume fewer resources than the individual tests that were merged, and thus, the performance of the computer running the merged test may be improved.

Figure 1:
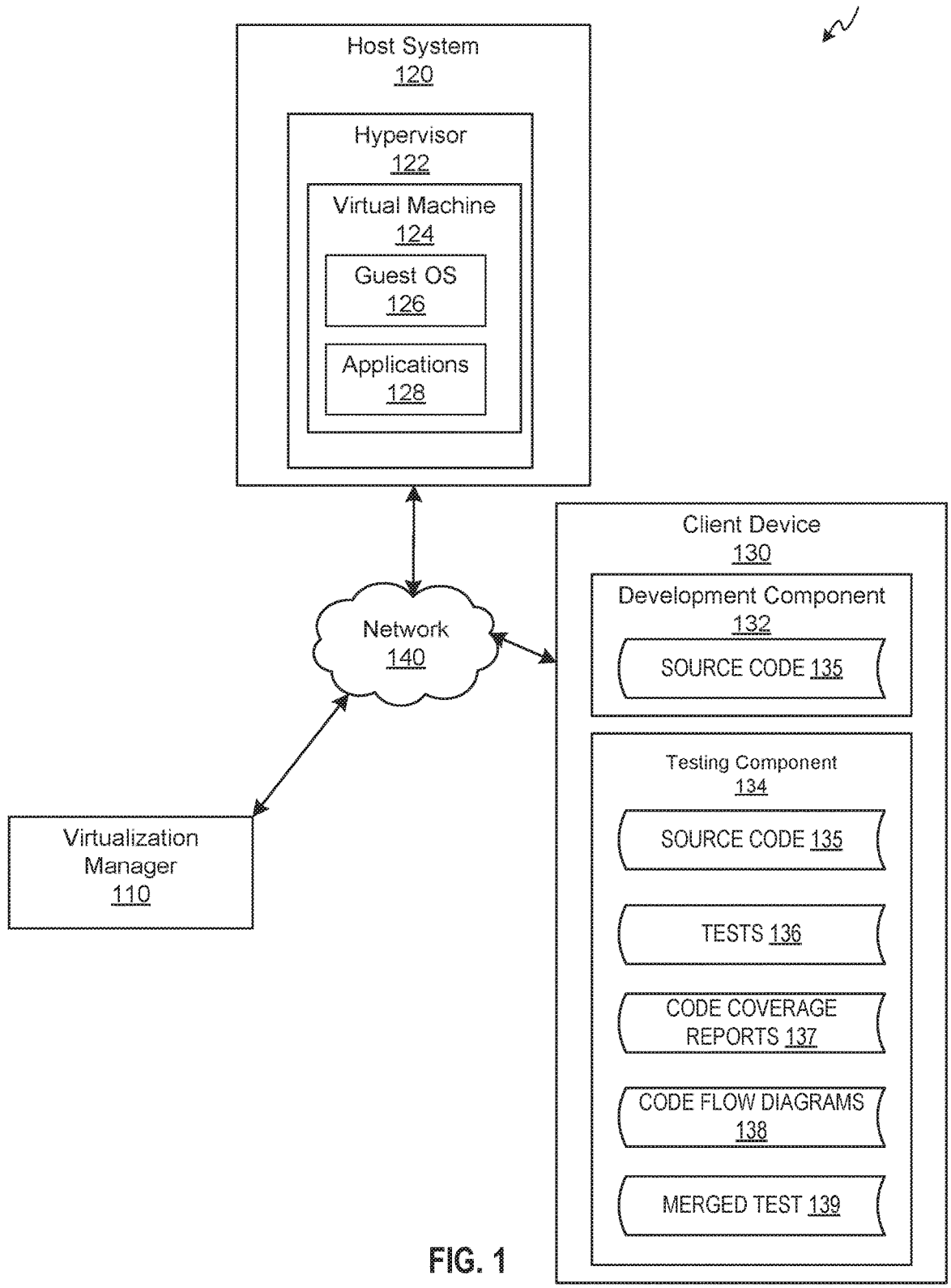
FIG. 1 depicts a high-level diagram of an example system architecture operating in accordance with one or more aspects of the present disclosure.

FIG. 1 illustrates an example system architecture 100 in which implementations of the disclosure may operate. The system architecture 100 may include a virtualization manager 110, a host system 120, and a client device 130 coupled via a network 140. The network 140 may be a public network (e.g., the Internet), a private network (e.g., a local area network (LAN) or wide area network (WAN)), or a combination thereof. Network 140 may include a wireless infrastructure, which may be provided by one or more wireless communications systems, such as a wireless fidelity (WiFi) hotspot connected with the network 140 and/or a wireless carrier system that can be implemented using various data processing equipment, communication towers, etc. Additionally or alternatively, networks 140 may include a wired infrastructure (e.g., Ethernet).

The host system 120 may comprise one or more processors communicatively coupled to memory devices and input/output (I/O) devices. The host system 120 may execute a hypervisor 122 to run one or more virtual machines 124. The hypervisor 122 may abstract the physical layer, including processors, memory, and I/O devices, of the host system 120 and present this abstraction to the virtual machines 124 as virtual devices. For example, as depicted, hypervisor 122 may run virtual machine 124. The virtual machine 124 may execute a guest operating system 126 that may utilize the underlying virtual devices, including virtual processors, virtual memory, and virtual I/O devices, among others.

One or more applications 128 may be running on the virtual machine 124 under the guest operating system 126. The hypervisor 122 may create, run, manage, and monitor various aspects of virtual machines operation, including the processing, and storage, memory, and network interfaces. In an illustrative example, hypervisor 122 may be provided by a Virtual Desktop and Server Management (VDSM) daemon (not shown). The VDSM daemon may include an application programming interface (API) with which the virtualization manager 110 interfaces.

The hypervisor 122, the virtual machine 124, the guest operating system 126, and/or the applications 128 may be implemented in source code (e.g., computer instructions) that is stored in one or more memories of the host system 120 and executed by one or more processing devices of the host system 120. An application developer (e.g., programmer) may write the source code in any suitable language using an integrated development environment (IDE), a software development kit (SDK), and the like. As described in more detail below, the source code may be tested to identify any issues (e.g., error, flaw, failure, fault, etc.) prior to releasing the source code via open source or closed source to be run on the host system 120.

The virtualization manager 110 may be hosted by a computer system and include one or more computer programs executed by the computer system for centralized management of the system architecture 100. The one or more computer programs may be implemented in source code that is also tested prior to being released for execution via the virtualization manager 110. In one implementation, the virtualization manager 110 may comprise various interfaces, including administrative interface, reporting interface, and/or application programming interface (API) to communicate with the host system 120 of system architecture 100, as well as to user portals, directory servers, and various other components, which are omitted from FIG. 1 for clarity.

The client device 130 may include any suitable computing device, such as a smartphone, tablet, laptop, desktop, server, or the like. As such, client device 130 may include one or more non-transitory, machine-readable storage media (e.g., memories) that store computer instructions and one or more processing devices that execute the stored computer instructions (explained further below with reference to FIG. 6). In an implementation, the client device 130 may include a development component 132 and a testing component 134. The development component 132 and the testing component 134 may be implemented in computer instructions stored on the one or more memories and executed by the one or more processing devices of the client device 130.

The development component 132 may include any suitable programming tool (e.g., computer program) to develop source code 135. The development component 132 may include a source code editor and a compiler or interpreter, which are omitted for clarity. The development component 132 may be used to create, debug, maintain, and/or support other applications (e.g., computer programs). As described above, a software developer may use the development component 132 to develop the source code 135 that implements the virtualization manager 110, the hypervisor 122, the virtual machine 124, the guest OS 126, the applications 128, or any suitable computer program to be used in the virtualized environment. In another example, the present disclosure may also be applicable to the source code 135 of computer programs that are implemented outside of virtualized environments. That is, the examples disclosed herein are not limited to source code of computer programs implemented in virtualized environments. Once the source code 135 has been developed, the source code 135 may be tested by the testing component 134.

In an implementation, the testing component 134 may be a standalone application or may be integrated in another application. For example, the testing component 134 may interface with the development component 132 that is used to develop the source code 135. In another example, the testing component 134 may be a plugin that can be integrated with the development component 132 or another application used to develop source code. The testing component 134 may access the source code 135 either locally (e.g., a data store on the client device 130) or remotely (e.g., via the network 140) for testing purposes.

The testing component 134 may analyze various tests 136 for the source code 135 to determine overlaps between the tests 136 and merge a subset of the tests 136 to reduce execution time of testing and consumed resources (e.g., processing, memory). The tests 136 may be automated and developed via an automation test framework. The tests 136 may test various operations of the source code 135 using various parameters. The tests 136 may traverse the same or different code paths in the source code 135 using the same or different parameters to exhaustively test each permutation for executing the source code 135. As such, there may be multiple overlaps of test cases and/or blocks of code that are accessed between the tests 136. Executing each of the tests 136 may cause the same blocks of code to be tested numerous times and waste execution time and/or resources of the client device 130. Thus, as described herein, the testing component 134 may be used to merge tests to resolve these undesirable effects of running tests including overlaps.

In an example, the testing component 134 may generate a code coverage report 137 for each test included in a test suite executed on the source code 135. A code coverage report 137 may include the source code 135 and an identification for each block of code of whether that block of code was tested by the particular test. A block of code may refer to a function, an individual line of code (e.g., an if statement) within a function, or the like. In an example, the code coverage report may be a hypertext markup language (HTML) report, an extensible markup language (XML) report, a JavaScript® object notation (JSON) report, or the like.

Generating the code coverage report 137 may depend on the programming language in which the source code 135 is written. In an example, the testing component 134 may include functionality or instrumentation for setting code coverage for the source code 135. In some programming languages (e.g., Java®), certain lines of code may be entered in the source code 135 to identify whether a test covers a particular block of code associated with the certain lines of code in a code coverage report 137. In other programming languages (e.g., Python®, PHP®), the code coverage report 137 may include the indications of whether the blocks of code are covered by the tests 136 without entering the certain lines of code. The code coverage reports 135 may be used to identify a number of times that a specific block of code was entered by the tests 136 or a number of times that a test case was executed on the blocks of code by the tests 136. For example, if a block of code is indicated in two code coverage reports 137 as being tested by two different tests

136, then there may be a duplication of the test 136 for that block of code and the testing code is being run twice in the two different tests 136.

The testing component 134 may generate a code flow diagram 138 for each of the code coverage reports 137 associated with the tests 136. The code flow diagrams 138 may include one or more nodes connected by one or more edges. The nodes may represent a block of code and/or a test case. For example, a node may represent a function in the source code 135 and/or a line of code within the function. That is, the source code 135 may include a series of function calls and inside the function calls may be a sequence of lines of code (e.g., if-else statements, loops, etc.). A graph may be created that includes nodes for the functions and inside of the function nodes may be nodes for the lines of code. The nodes may be linked via edges to represent the sequence of events between the functions and lines of code in the source code 135.

Each of the code flow diagrams 138 may include indications of whether a particular node (e.g., block of code) is tested by the test 136 associated with the particular code flow diagram 138. The testing component 134 may merge a subset of the code flow diagrams 138 to create a merged test 139. The merged test 139 may include code associated with the nodes that are indicated as being tested in the code flow diagrams 138 that are merged. The tests 136 associated with the code flow diagrams 138 that are merged may be discarded, and the merged test 139 may be executed instead, along with any other tests 136 that were not merged.

In an implementation, when an intersection is found in the source code 135 being tested that splits into two or more code paths (e.g., using different input parameters), the testing component 134 may include code in the merged test 139 that tests each code path via different parameters by saving a state of the test being executed at the intersection, testing one code path with a first input parameter, reverting to the saved state, and testing another code path with another input parameter. This reverting and testing may be performed until each code path at the intersection is tested. Some examples of saving test state may include taking a snapshot of the VM 124 via the hypervisor 122, saving the test state via the testing component 134, using Berkeley Lab Checkpoint/Restart (BLCR) to take a snapshot without using the VM 124, or any suitable technique for saving the test state (e.g., creating snapshots or checkpoints).

Figure 2:
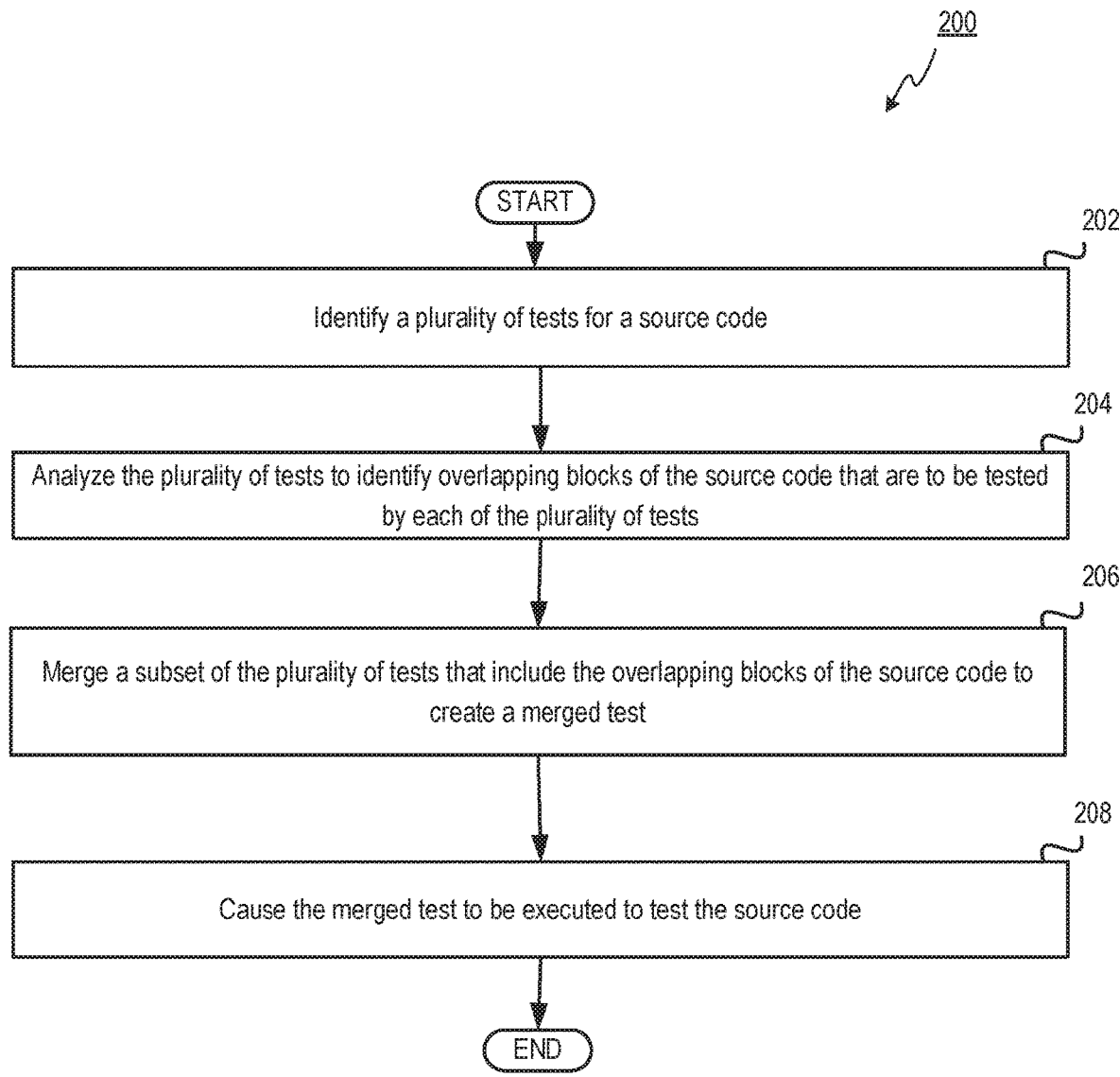
FIG. 2 depicts a flow diagram of an example method for merging tests for source code, in accordance with one or more aspects of the present disclosure.

FIG. 2 depicts a flow diagram of an example method 200 for merging tests for source code, in accordance with one or more aspects of the present disclosure. Method 200 and each of its individual functions, routines, subroutines, or operations may be performed by one or more processing devices of the computer device executing the method. In certain implementations, method 200 may be performed by a single processing thread. Alternatively, method 200 may be performed by two or more processing threads, each thread executing one or more individual functions, routines, subroutines, or operations of the method. In an illustrative example, the processing threads implementing method 200 may be synchronized (e.g., using semaphores, critical sections, and/or other thread synchronization mechanisms). Alternatively, the processes implementing method 200 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 200 may be performed by testing component 134 executed by one or more processing devices of the client device 130.

Method 200 may begin at block 202. At block 202, a processing device executing the testing component 134 may identify a plurality of tests 136 for a source code 135. The source code 135 may include blocks of code (e.g., functions, lines of code within the functions, etc.). The plurality of tests 136 may include automation tests that are developed to exhaustively test each code path in the source code 135. In some instances, numerous tests 136 may include overlapping test cases and/or blocks of code that are tested.

At block 204, the processing device may analyze the plurality of tests 136 to identify the overlapping blocks of the source code 135 and/or test cases that are to be tested by each of the tests 136. Analyzing the tests 136 may include generating code coverage reports 137 each associated with one of the tests 136. Each of the code coverage reports 137 may provide an indication of one or more of the plurality of blocks of code that are tested by a respective test 136. Further, analyzing the tests 136 may include generating a code flow diagram 138 for each of the code coverage reports 137. The code flow diagram 138 may include nodes representing the blocks of code of the source code 135 and edges connecting the nodes. Each of the nodes in the code flow diagram 138 may include an indication of whether a represented block of code and/or a test case is tested by the respective test 136.

At block 206, the processing device may merge a subset of the tests 136 that includes the overlapping blocks of the source code 135 to create a merged test 139. In an example, merging the subset of tests 136 may include selecting the subset of tests 136 in view of a predetermined threshold related to an execution time of blocks of code in the subset of tests or a predetermined threshold related to a percentage of the overlapping blocks of the source code 135 that are to be tested by each of the tests 136. For example, if over a certain percentage threshold (e.g., fifty percent, sixty percent, seventy percent, etc.) of the same blocks of the source code 135 are tested in two different tests 136, then those tests may be merged. Another threshold may relate to the number of tests that cover the particular block of code. For example, the processing device may merge tests 136 when at least four tests test the same block of source code 135.

In another example, merging the subset of tests 136 may include identifying an intersection that splits into at least two code paths in a block of code of at least one of the subset of tests 136. The two code paths may be traversed using different input parameters. For example, if the intersection is an if-else statement, a first input parameter may cause execution to enter the if statement block and another input parameter may cause execution to enter the else statement block. In an implementation, the processing device may take a snapshot of the intersection and include code in the merged test that tests the first code path of the at least two code paths with a first parameter, revert to the snapshot of the intersection, and test a second code path of the at least two code paths with a second parameter. It should be noted that any number of code paths may be tested at the intersection using the snapshot and appropriate parameters in this manner.

In an example, merging the subset of tests 136 may include merging code flow diagrams 138 of two or more code coverage reports 137 of the plurality of code coverage reports to create a merged code flow diagram. The merged code flow diagram includes at least one node representing a block of code that is indicated as being tested in each of the code flow diagrams 138 that were merged. Further, the processing device may create the merged test 139 for the source code 135 in view of the merged code flow diagram.

At block 208, the processing device may cause the merged test 139 to be executed to test the source code 135. In an implementation, the processing device may also discard the subset of tests 136. The merged test 139 may test the same blocks of code of the source code 135 as the subset of tests 136 that were merged. In an example, prior to executing the merged test 139, the processing device may generate a code coverage report 137 for the merged test to ensure that the merged test 139 tests the same blocks of code as the subset of tests 136. Upon verification that the code coverage is the same, the processing device may execute the merged test 139 on the source code 135 along with any other tests 136 that were not merged. Executing the merged test 139 may be performed in less time than executing the subset of the tests 136 that were merged.

Figure 3:
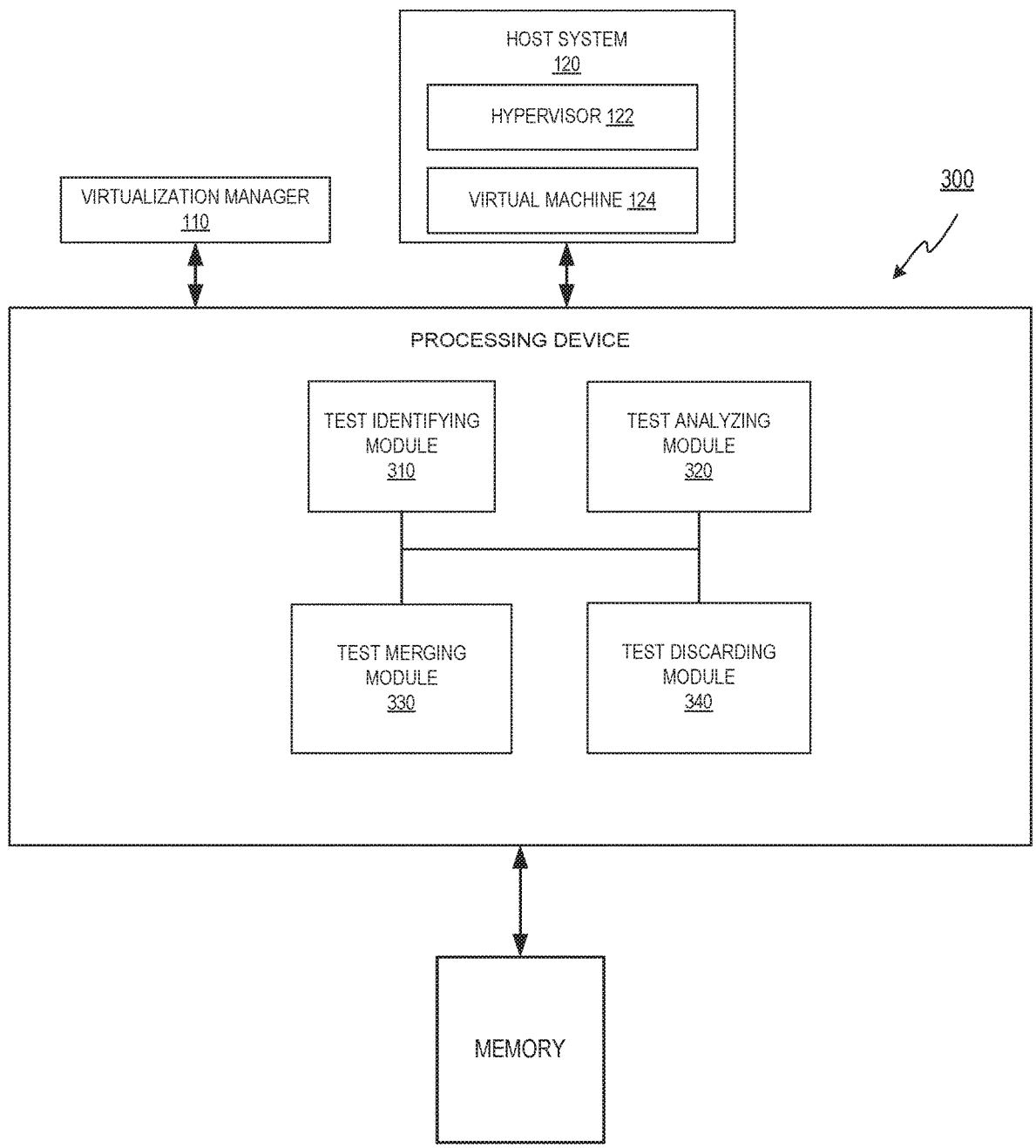
FIG. 3 depicts a block diagram of an example computer system, in accordance with one or more aspects of the present disclosure.

FIG. 3 depicts a block diagram of an example computer system 300, in accordance with one or more aspects of the present disclosure. Computer system 300 may be the same or similar to the client device 130 and may include one or more processing devices and one or more memory devices. In the example shown, computer system 300 may include test identifying module 310, test analyzing module 320, test merging module 330, and test discarding module 340. Also, as depicted, computer system 300 may be communicatively coupled to the host system 120 and the computing device hosting the virtualization manager 110. The host system 120 may execute the hypervisor 122 to run the one or more virtual machines 124. The virtualization manager 110 may communicate with the host system 120 to manage virtual machines 124 via the hypervisor 122.

The test identifying module 310 may identify tests 136 for a source code 135. The source code 135 may include blocks of code (e.g., functions, lines of code within the functions, etc.). The tests 136 may include automation tests that are developed to exhaustively test each code path in the source code 135. In some instances, numerous tests 136 may include overlapping test cases and/or blocks of code that are tested.

The test analyzing module 320 may analyze the tests 136 to identify the overlapping blocks of the source code 135 and/or test cases that are to be tested by each of the tests 136. Analyzing the tests 136 may include generating code coverage reports 137 each associated with one of the tests 136. Each of the code coverage reports 137 may provide an indication of one or more of blocks of code that are tested by a respective test 136. Further, analyzing the tests 136 may include generating a code flow diagram 138 for each of the code coverage reports 137. The code flow diagram 138 may include nodes representing the blocks of code of the source code 135 and edges connecting the nodes. Each of the nodes in the code flow diagram 138 may include an indication of whether a represented block of code and/or a test case is tested by the respective test 136.

The test merging module 330 may merge a subset of the tests 136 that include the overlapping blocks of the source code 135 to create a merged test 139. In an example, merging the subset of tests 136 may include selecting the subset of tests 136 in view of a predetermined threshold (e.g., execution time threshold, overlap percentage, number of tests including the overlap threshold, etc.). In an example, merging the subset of tests 136 may include merging code flow diagrams 138 of two or more code coverage reports 137 of the plurality of code coverage reports to create a merged code flow diagram. The merged code flow diagram includes at least one node representing a block of code that is indicated as being tested in each of the code flow diagrams 138 that were merged. Further, the processing device may create the merged test for the source code 135 in view of the merged code flow diagram. The merged test may include code from the merged tests associated with the code flow diagrams 138 that were merged.

The test discarding module 340 may discard the subset of tests 136. The merged test 139 may test the same blocks of code of the source code 135 as the subset of tests 136 that were merged. The merged test 139 and the remaining tests may be executed on the source code 135. As previously noted, the merged test 139 may execute in less time and consume less resources of the client device 130 than executing the subset of tests 136 that were merged.

Figure 4:
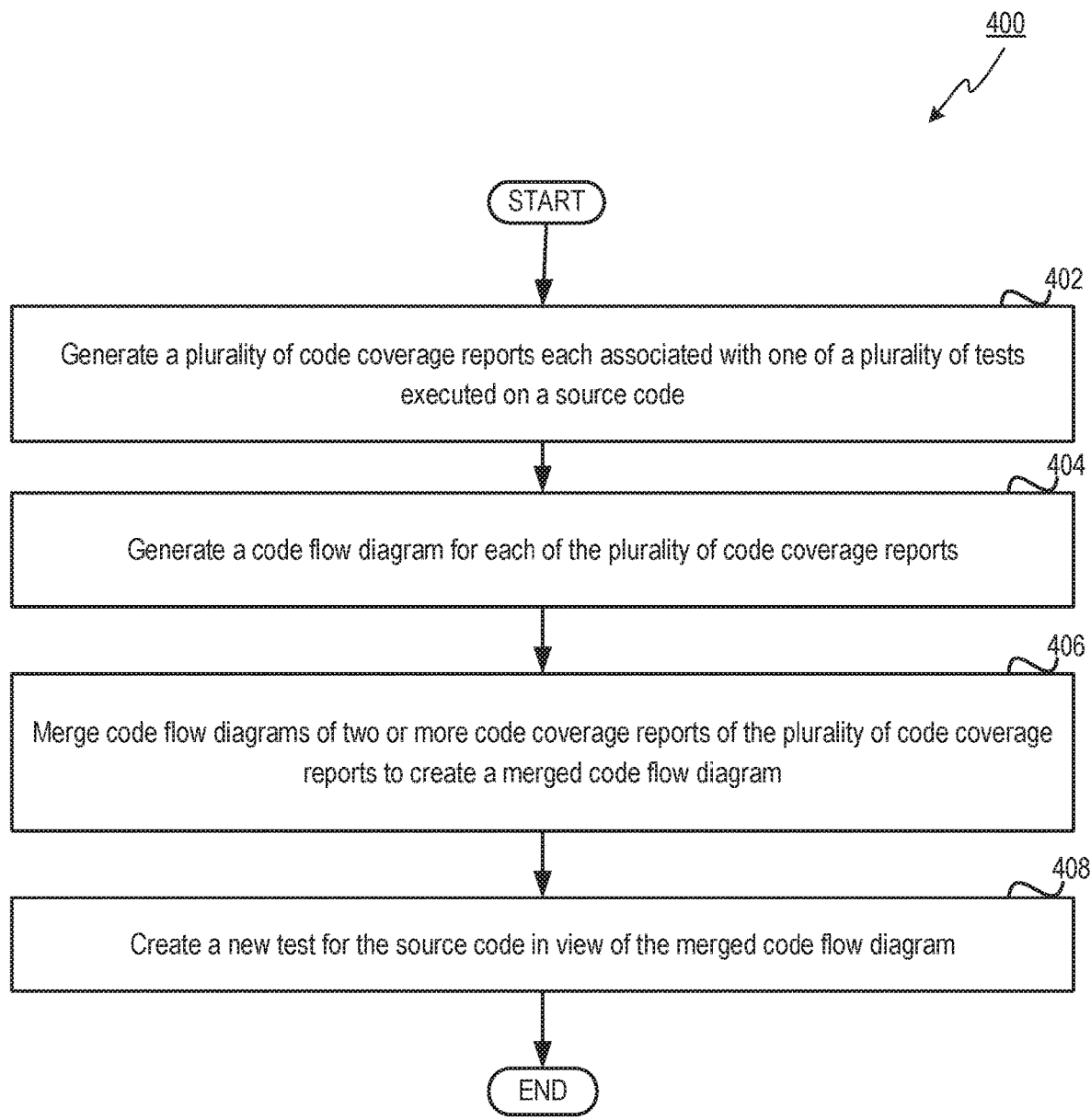
FIG. 4 depicts a flow diagram of another example method for merging tests for source code, in accordance with one or more aspects of the present disclosure.

FIG. 4 depicts a flow diagram of another example method 400 for merging tests 136 for source code 135, in accordance with one or more aspects of the present disclosure. Method 400 includes operations performed by the client device 130. Also, method 400 may be performed in the same or a similar manner as described above in regards to method 200. Method 400 may be performed by processing devices of the client device 130 executing the testing component 134.

Method 400 may begin at block 402. At block 402, the processing device may generate a plurality of code coverage reports 137 each associated with one of a plurality of tests 136 executed on a source code 135. The source code 135 may include blocks of code and each of the blocks of the code coverage reports 137 provide an indication of one or more of blocks of code and/or test cases that are tested by a respective test 136.

At block 404, the processing device may generate a code flow diagram 138 for each of the code coverage reports 137. The code flow diagram 138 may include nodes representing the blocks of the source code 135 and/or test cases. Each of the nodes in the code flow diagram 138 may include an indication of whether a represented block of code is tested by the respective test.

At block 406, the processing device may merge the code flow diagrams 138 of two or more code coverage reports 137 to create a merged code flow diagram. The merged code flow diagram may include at least one node representing a block of code and/or test case that is indicated as being tested in each of the code flow diagrams that are merged. To merge the code flow diagrams 138, the processing device may select the code flow diagrams 138 in view of a predetermined threshold related to an execution time of blocks of code represented by nodes in the code flow diagrams 138, a predetermined threshold related to a percentage of overlap between nodes representing blocks of code that are indicated as being tested in the code flow diagrams 138, a predetermined threshold related to the number of tests that test the same blocks of the source code 135 or include the same test cases, or the like.

Also, in an implementation, the processing device may compile (e.g., test) code included in the new test to determine whether the new test executes without any errors. Further, the processing device may generate a code coverage report for the new test to ensure that the new test tests the same blocks of code as the tests that were merged as indicated in the code coverage reports 138 represented by the code flow diagrams 138 of the tests that were merged. In another example, to merge the code flow diagrams 138, the processing device may identify an intersection that splits into at least two code paths in at least one of the code flow diagrams 138 to be merged. The processing device may take a snapshot of the intersection and include nodes in the merged code flow diagram that test a first code path of the at least two code paths with a first parameter, revert to the snapshot of the intersection, and test a second code path of the at least two code paths with a second parameter.

At block 408, the processing device may create a new test (e.g., the merged test 139) for the source code 135 in view of the merged code flow diagram. The new test tests the same blocks of code as the tests that were merged as indicated in the code coverage reports 137 represented by the code flow diagrams 138. Further, the new test may execute in less time than executing the tests that were merged.

Figure 5A:
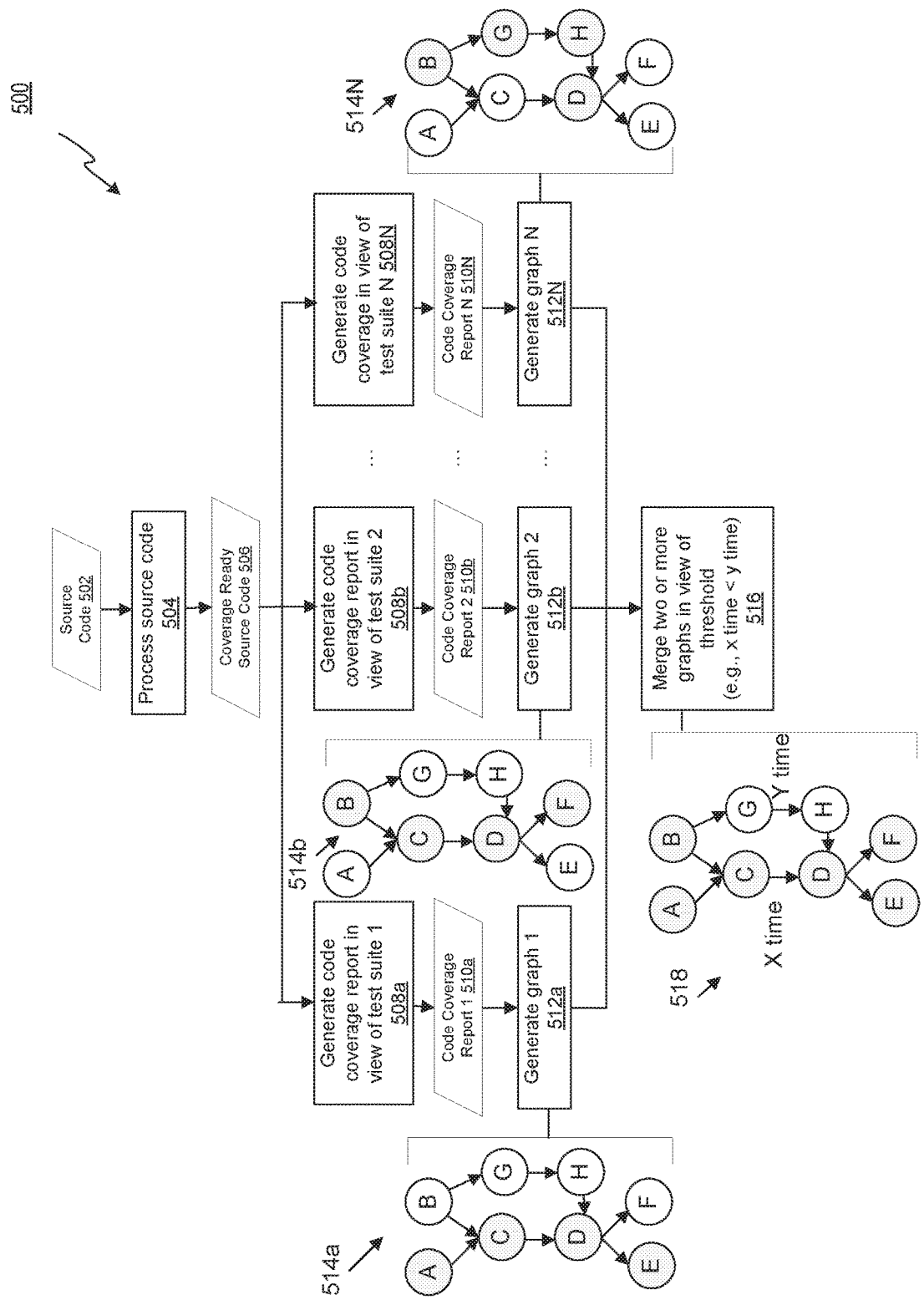
FIG. 5A depicts a flow diagram of an example method for using a threshold to merge tests for source code, in accordance with one or more aspects of the present disclosure.

FIG. 5A depicts a flow diagram of an example method 500 for using a threshold to merge tests 136 for source code 135, in accordance with one or more aspects of the present disclosure. Method 500 includes operations performed by the client device 130. Also, method 500 may be performed in the same or a similar manner as described above in regards to method 200. Method 500 may be performed by processing devices of the client device 130 executing the testing component 134.

Method 500 may begin at block 504. At block 504, the processing device processes source code 502. Source code 502 may be accessed in a data store on the client device 130 or may be retrieved from a source external to the client device 130 via the network 140. In one example, the processing device may insert lines of code into the source code 502 depending on the programming language in which the source code 502 is written. In another example, depending on the programming language in which the source code 502 is written, the source code 502 may be coverage ready source code 506 without adding any lines of code to the source code 502. As such, processing may include determining the programming language in which the source code is written to further determine whether lines of code are to be added to the source code. After the source code 502 is processed, coverage ready source code 506 may be generated.

At blocks 508a, 508b, 508N the processing device may use the coverage ready source code 506 to generate code coverage reports 510a, 510b, 510N in view of test suites 1, 2, N, respectively. The code coverage reports 510a, 510b, 510N may include an indication of which blocks of code and/or test cases are tested in each of the tests of each of the test suites 1, 2, N. At block 512a, 512b, 512N, the processing device may generate code flow diagrams (e.g., graphs) 1, 2, N in view of the code coverage reports 1 (510a), 2 (510b), N (510N). The graphs 1, 2, N may be generated by creating a node for each block of code (e.g., function call, line of code, etc.) in the source code 502 and connecting the nodes via edges to represent the sequence of events in the source code 502. Also, indications may be included for each node that is tested by the tests of a particular test suite.

For example, graph 1 (514a) includes nodes A, B, C, D, E, F, G, and H interconnected via edges. As depicted, the processing device highlighted (e.g., indication) nodes A, C, D, and E in view of the code cover report 1 (510a) because those are the nodes (e.g., blocks of source code 502) that are tested by test suite 1. Graph 2 (514b) also includes nodes A, B, C, D, E, F, G, and H interconnected via edges since the same source code 502 is being tested. However, the processing device highlighted (e.g., indication) nodes B, C, D, and F in graph 2 (514b) as those are the nodes tested by test suite 2. Graph N (514N) also includes nodes A, B, C, D, E, F, G, and H interconnected via edges since the same source code 502 is being tested. However, the processing device highlighted (e.g., indications) nodes B, G, H, and D in graph N (514N) as those are the nodes tested by test suite N.

At block 516, the processing device may merge two or more of the graphs in view of a predetermined threshold to create a merged graph 518. Merging the two or more graphs may include the processing device analyzing the code flow diagrams (e.g., graphs 1 (514a), 2 (514b), N (514N)) to identify overlapping nodes in each of the tests and selecting the two or more graphs in view of the predetermined threshold (e.g., execution time). It should be understood that code flow diagrams and graphs may be used interchangeably herein. For example, the processing device may identify that graph 1 (514a), graph 2 (514b), and graph N (514N) each test node D. Additionally, the processing device may identify that graph 1 (514a) and graph 2 (514b) both test nodes C and D, graph 1 (514a) and graph N (514b) both test node D, and graph 2 (514b) and graph N (514N) both test nodes B and D. The processing device may identify that executing nodes C and D takes X time and executing blocks G and H takes Y time where X time is less than Y time. As such, the processing device may select graphs 1 (514a) and 2 (514b) to merge because they include overlapping nodes C and D with execution time of X and may exclude graph N (514N) in the merged graph 518 because it includes nodes G and H with execution time of Y.

Merged graph 518 tests the same nodes of both graph 1 (514a) and graph 2 (514b) as depicted by the highlighted indications of nodes A, B, C, D, E, and F. In an example, the merged test 518 may execute in less time and use less resources than executing the tests associated with graph 1 (514a) and graph 2 (514b). Further, the processing device may discard the tests associated with the graphs 1 (514a) and 2 (514b) after the merged graph 518 is created. The processing device may execute the code of the new test associated with the merged graph 518 and the test associated with graph N (514N) to test the source code 502.

Figure 5B:
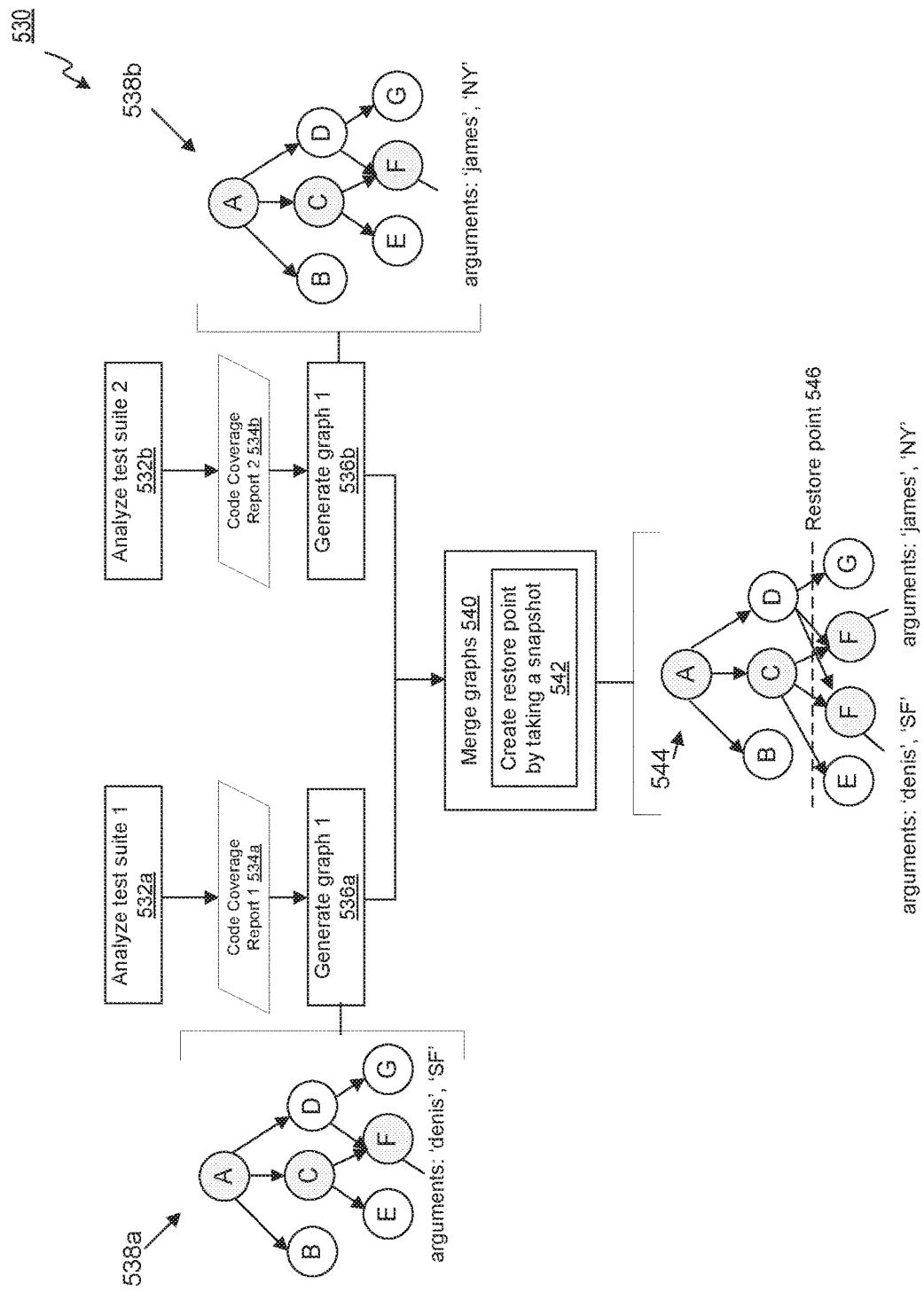
FIG. 5B depicts a flow diagram of an example method for using a snapshot to merge tests for source code, in accordance with one or more aspects of the present disclosure.

FIG. 5B depicts a flow diagram of an example method 530 for using a snapshot to merge tests for source code, in accordance with one or more aspects of the present disclosure. Method 530 includes operations performed by the client device 130. Also, method 530 may be performed in the same or a similar manner as described above in regards to method 200. Method 530 may be performed by processing devices of the client device 130 executing the testing component 134.

Method 530 may begin at blocks 532a, 532b. At blocks 532a, 532b, the processing device may analyze test suite 1 and test suite 2 in view of the source code to be tested. The processing device may generate a code coverage report 1 (534a) and 2 (534b) for each of the tests in each of the test suites 1 and 2. The code coverage report may include the source code to be tested and indications of which blocks of the source code and/or test cases are tested in each of the tests.

At blocks 536a and 536b, the processing device may generate graphs 1 (538a) and 2 (538b) in view of the code cover reports 1 (534a) and 2 (534b). As depicted, each graph 1 (538a) and 2 (538b) includes nodes A, B, C, D, E, F, and G of the source code to be tested. Further, graphs 1 (538a)

and 2 (538*b*) include highlighting (e.g., indications) of nodes A, C, and F that are tested by one or more tests of test suite 1 and test suite 2. As depicted, node F is tested by test suite 1 using a first set of parameters (e.g., arguments: 'denis', 'SF') and node F is tested by test suite 2 using a second set of parameters (e.g., arguments: 'james', 'NY'). The first set of parameters may cause a line of code (e.g., if statement) to trigger a first code path and the second set of parameters may cause a line of code to (e.g., else statement) to trigger a second code path.

In an example, to preserve code coverage when testing the same or different code paths on different input parameters, the processing device may merge (block 540) the graphs 1 (538*a*) and 2 (538*b*) to create a merged graph 544 and create (block 542) a restore point 546 by taking a snapshot at the intersection where different input parameters are used by different tests. A snapshot may refer to a state of the test at a particular point in time. As depicted in the merged graph 544, the restore point 546 is taken at the intersection of the graphs 1 (538*a*) and 2 (538*b*) where different input parameters are used. In some examples, the restore point 546 may be taken at a place prior to the intersection. The merged graph 544 may include nodes (e.g., F) that test a first code path with the first input parameters (e.g., arguments: 'denis', 'SF') and then revert to the restore point 546 and test the second code path with the second input parameters (e.g., arguments: 'james', 'NY'). As a result, the merged graph 544 may include code to test each permutation of code paths using the different input parameters to preserve the code coverage of the tests from test suite 1 and 2 that were merged into the merged graph 544.

Once merged, instead of running the tests of test suite 1 and test suite 2, the processing device may execute code of the new test associated with the merged graph 544. Accordingly, tests associated with the graphs 1 (538*a*) and 2 (538*b*) may be discarded. As discussed above, the merged test associated with the merged graph 544 may execute in less time and consume less resources (e.g., processing, memory) than individually executing the tests that were merged.

Figure 6:
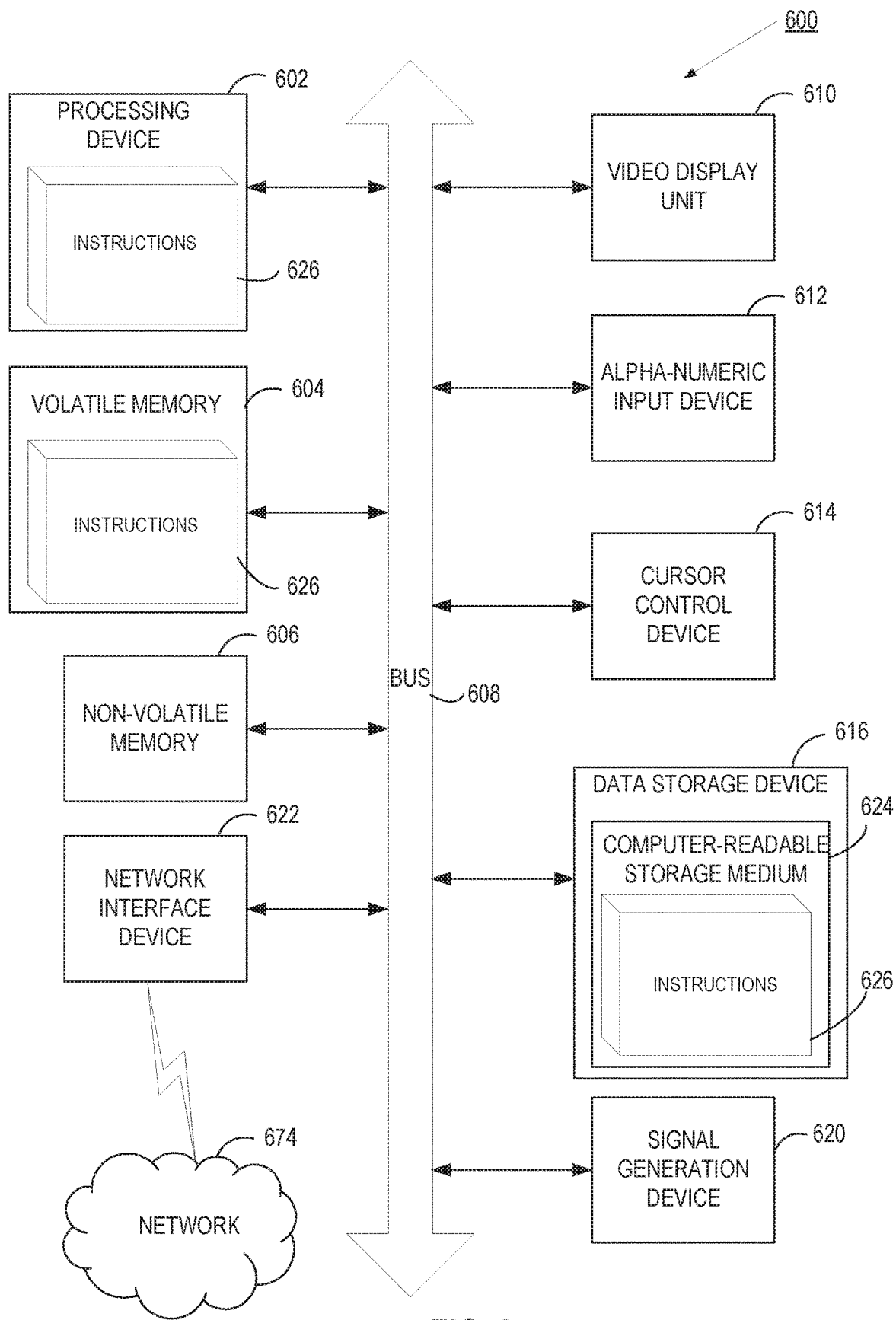
FIG. 6 depicts a block diagram of an illustrative computing device operating in accordance with the examples of the present disclosure.

FIG. 6 depicts a block diagram of a computer system operating in accordance with one or more aspects of the present disclosure. In various illustrative examples, computer system 600 may correspond to a computing device within system architecture 100 of FIG. 1. In one implementation, the computer system 600 may be the client device 130. The computer system 600 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host system to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alpha-numeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions encoding testing component 134 of FIG. 1 for implementing methods 200, 400, 500, and/or 530.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "associating," "deleting," "initiating," "marking," "generating," "recovering," "completing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 200 and 400, and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   identifying a plurality of tests for a source code;
   analyzing the plurality of tests to identify overlapping blocks of the source code that are to be tested by each of the plurality of tests, the analyzing comprising:
      generating a plurality of code coverage reports each associated with one of the plurality of tests, wherein the source code comprises a plurality of blocks of code and each of the plurality of code coverage reports provides an indication of one or more of the plurality of blocks of code that are tested by a respective test of the plurality of tests; and
      generating code flow diagrams corresponding to the plurality of tests, wherein a respective code flow diagram of the code flow diagrams is generated for each of the plurality of code coverage reports, the respective code flow diagram comprising a plurality of nodes representing the plurality of blocks of code of the source code, and each of the plurality of nodes in the respective code flow diagram comprising an indication of whether a represented block of code is tested by the respective test;
   identifying, in the code flow diagrams corresponding to the plurality of tests, first nodes corresponding to the overlapping blocks of the source code that are to be tested by a subset of the plurality of tests and second nodes corresponding to blocks of the source code that are to be uniquely tested by each of the subset of the plurality of tests;
   determining that a determined threshold representing coverage of the subset of the plurality of tests with respect to the overlapping blocks of the source code is satisfied;
   responsive to determining that the determined threshold is satisfied, merging, by a processing device, the subset of the plurality of tests that comprise the overlapping blocks of the source code to create a merged test comprising the first nodes and the second nodes, wherein merging the subset of the plurality of tests comprises:
      selecting code flow diagrams of two or more code coverage reports of the plurality of code coverage reports in view of the determined threshold; and
      merging the code flow diagrams of two or more code coverage reports of the plurality of code coverage reports to create a merged code flow diagram, the merged code flow diagram comprising at least one node representing a block of code that is indicated as being tested in each of the code flow diagrams;
   creating the merged test for the source code in view of the merged code flow diagram; and
   causing the merged test to be executed to test the source code.

2. The method of claim 1, wherein the merged test tests the same blocks of code of the source code as the subset of the plurality of tests.

3. The method of claim 1, wherein the determined threshold associated with the overlapping blocks of the source code is further associated with an execution time of blocks of code in the subset of the plurality of tests or a percentage of the overlapping blocks of the source code that are to be tested by each of the plurality of tests, and merging the subset of the plurality of tests further comprises:
   selecting the subset of the plurality of tests in view of the determined threshold associated with the overlapping blocks of the source code.

4. The method of claim 1, further comprising, prior to executing the merged test, generating a code coverage report for the merged test to ensure that the merged test tests the same blocks of code as the subset of the plurality of tests.

5. The method of claim 1, wherein merging the subset of the plurality of tests comprises:
   identifying an intersection that splits into at least two code paths in a block of code of at least one of the subset of the plurality of tests;
   generating a snapshot of the intersection;
   including code in the merged test that:
   tests a first code path of the at least two code paths with a first parameter;
   reverts to the snapshot of the intersection; and
   tests a second code path of the at least two code paths with a second parameter.

6. The method of claim 1, further comprising executing the merged test, the executing of the merged test is performed in less time than executing the subset of the plurality of tests.

7. A system comprising:
   a memory storing a testing component; and
   a processing device communicatively coupled to the memory, the processing device executes the testing component to:
      identify a plurality of tests for a source code;

analyze the plurality of tests to identify overlapping blocks of the source code that are to be tested by each of the plurality of tests, the analyzing comprising:

generating a plurality of code coverage reports each associated with one of the plurality of tests, wherein the source code comprises a plurality of blocks of code and each of the plurality of code coverage reports provides an indication of one or more of the plurality of blocks of code that are tested by a respective test of the plurality of tests; and generating code flow diagrams corresponding to the plurality of tests, wherein a respective code flow diagram of the code flow diagrams is generated for each of the plurality of code coverage reports, the respective code flow diagram comprising a plurality of nodes representing the plurality of blocks of code of the source code, and each of the plurality of nodes in the respective code flow diagram comprising an indication of whether a represented block of code is tested by the respective test;

identify, in the code flow diagrams corresponding to the plurality of tests, first nodes corresponding to the overlapping blocks of the source code of a subset of the plurality of tests and second nodes corresponding to blocks of the source code that are to be uniquely tested by each of the subset of the plurality of tests;

determine that a determined threshold representing coverage of the subset of plurality of tests with respect to the overlapping blocks of the source code is satisfied;

responsive to determining that the determined threshold is satisfied, merge the subset of the plurality of tests that comprise the overlapping blocks of the source code to create a merged test comprising the first nodes and the second nodes, wherein merging the subset of the plurality of tests comprises:

selecting code flow diagrams of two or more code coverage reports of the plurality of code coverage reports in view of the determined threshold; and merging the code flow diagrams of two or more code coverage reports of the plurality of code coverage reports to create a merged code flow diagram, the merged code flow diagram comprising at least one node representing a block of code that is indicated as being tested in each of the code flow diagrams;

create the merged test for the source code in view of the merged code flow diagram; and cause the merged test to be executed to test the source code.

8. The system of claim 7, wherein the determined threshold associated with the overlapping blocks of the source code is further associated with an execution time of blocks of code in the subset of the plurality of tests or a percentage of the overlapping blocks of the source code that are to be tested by each of the plurality of tests, and to merge the subset of the plurality of tests, the processing device is to:

select the subset of the plurality of tests in view of the determined threshold associated with the overlapping blocks of the source code.

9. A non-transitory computer-readable media storing instructions that, when executed, cause one or more processing devices to:

generate a plurality of code coverage reports each associated with one of a plurality of tests executed on a source code, the source code comprises a plurality of blocks of code and each of the plurality of code coverage reports provides an indication of one or more of the plurality of blocks of code that are tested by a respective test of the plurality of tests;

generate a code flow diagram for each of the plurality of code coverage reports, the code flow diagram comprising a plurality of nodes representing the plurality of blocks of code of the source code, and each of the plurality of nodes in the code flow diagram comprising an indication of whether a represented block of code is tested by the respective test;

identifying, in the code flow diagrams corresponding to the plurality of code coverage reports, first nodes corresponding to overlapping blocks of the source code of a subset of the plurality of tests and second nodes corresponding to blocks of the source code that are to be uniquely tested by each of the subset of the plurality of tests;

merging, by a processing device, the subset of the plurality of tests that comprise the overlapping blocks of the source code in view of a determined threshold associated with the overlapping blocks of the source code to create a merged test comprising the first nodes and the second nodes, wherein merging the subset of the plurality of tests comprises merging code flow diagrams of two or more code coverage reports of the plurality of code coverage reports to create a merged code flow diagram, the merged code flow diagram comprising at least one node representing a block of code that is indicated as being tested in each of the code flow diagrams;

determine that a determined threshold representing coverage of the subset of plurality of tests with respect to the overlapping blocks of the source code is satisfied;

responsive to determining that the determined threshold is satisfied:

select code flow diagrams of two or more code coverage reports of the plurality of code coverage reports in view of the determined threshold; and merge the selected code flow diagrams to create a merged code flow diagram, the merged code flow diagram comprising at least one node representing a block of code that is indicated as being tested in each of the code flow diagrams; and create a new test for the source code in view of the merged code flow diagram, wherein the new test comprises the first nodes and the second nodes.

10. The computer-readable media of claim 9, wherein the new test tests the same blocks of code as two or more tests of the plurality of tests as indicated in the two or more code coverage reports represented by the code flow diagrams.

11. The computer-readable media of claim 9, wherein the determined threshold associated with the overlapping blocks of code is further associated with an execution time of blocks of code represented by nodes in the code flow diagrams.

12. The computer-readable media of claim 9, wherein the determined threshold associated with the overlapping blocks of code is further associated with a percentage of overlap between nodes representing blocks of code that are indicated as being tested in the code flow diagrams.

13. The computer-readable media of claim 9, wherein the processing device is further to:
  generate a code coverage report for the new test to ensure that the new test tests the same blocks of code as two or more tests of the plurality of tests as indicated in the two or more code coverage reports represented by the code flow diagrams.

14. The computer-readable media of claim 9, wherein to merge the code flow diagrams, the one or more processing devices are to:
  identify an intersection that splits into at least two code paths in at least one of the code flow diagrams;
  generate a snapshot of the intersection;
  include nodes in the merged code flow diagram that:
  test a first code path of the at least two code paths with a first parameter;
  revert to the snapshot of the intersection; and
  test a second code path of the at least two code paths with a second parameter.

15. The computer-readable media of claim 9, wherein the one or more processing devices are further to, prior to merging the code flow diagrams, test the plurality of blocks of code represented by the plurality of nodes in the code flow diagrams.

16. The computer-readable media of claim 9, wherein the new test executes in less time than executing two or more tests of the plurality of tests represented by the code flow diagrams of the two or more code coverage reports.

\* \* \* \* \*